United States Patent [19]

Kakidaira

[11] Patent Number: 4,945,456
[45] Date of Patent: Jul. 31, 1990

[54] HIGH-MOUNTED STOPLIGHT FOR MOTOR VEHICLE

[75] Inventor: Susumu Kakidaira, Shizuoka, Japan

[73] Assignee: Koito Manufacturing Co., Ltd., Tokyo, Japan

[21] Appl. No.: 288,343

[22] Filed: Dec. 22, 1988

[30] Foreign Application Priority Data

Dec. 28, 1987 [JP] Japan .............................. 62-330006

[51] Int. Cl.$^5$ .............................................. B60Q 1/00
[52] U.S. Cl. .................................. 362/80.1; 362/359; 362/368
[58] Field of Search ................... 362/61, 80, 80.1, 367, 362/343, 346, 359

[56] References Cited

U.S. PATENT DOCUMENTS

| | | | |
|---|---|---|---|
| 3,436,758 | 4/1969 | Kluth | 362/80.1 |
| 4,626,967 | 12/1986 | Segoshi | 362/61.80 |
| 4,652,979 | 3/1987 | Arima | 362/80 |
| 4,722,023 | 1/1988 | Arima et al. | 362/80 |
| 4,724,515 | 2/1988 | Matsuti et al. | 362/80.1 |
| 4,733,335 | 3/1988 | Serizawa et al. | 362/80 |
| 4,751,493 | 6/1988 | Miller | 362/61 |
| 4,831,501 | 5/1989 | Okamoto et al. | 362/61 |

*Primary Examiner*—Ira S. Lazarus
*Assistant Examiner*—D. M. Cox
*Attorney, Agent, or Firm*—Sughrue, Mion, Zinn, Macpeak & Seas

[57] ABSTRACT

A rear-deck stoplight for automotive use is designed such that light emitted therefrom and reflected from the interior and exterior surfaces of the rear window passes beneath the rearview mirror of the vehicle so as to not hinder the driver's vision while braking. The light is separated from the rear window by a gap. A lens covering the lamp is generally angled with respect to the rear window, and a shade at least partially bounds said lens. The gap size, the lens angle and particularly the shade height are selected so as to limit reflected light to a region below the height of the rearview mirror.

8 Claims, 6 Drawing Sheets

HIGH-MOUNTED STOPLIGHT FOR MOTOR VEHICLE

BACKGROUND OF THE INVENTION

The present invention relates to a high-mounted stoplight for a motor vehicle, and particularly to a high-mounted stoplight centered inside the rear window thereof.

A conventional high-mounted stoplight of this kind is disposed over the baggage shelf inside the rear window 1 of the automobile, as shown in FIG. 13. The body 2 of the stoplight comprises a main part 4 housing a bulb 3, and a body cover 5 for protecting the main part. A front lens 6 is attached to the body 2 of the stoplight and covers the front opening of the body. The front lens 6 faces the rear window 1 of the motor vehicle. When the driver of the vehicle has depressed the brake pedal thereof, the stoplight is turned on to call the attention of the driver of a following vehicle or the like. However, since there is a gap between the front lens 6 of the stoplight and the rear window 1 of the motor vehicle, some of the light emitted from the stoplight is reflected by the rear window and proceeds toward the front of the vehicle. The reflected light is likely to be further reflected by the rearview mirror 7 of the vehicle to interfere with the driver's vision.

In order to solve this problem, a protector 8 made of rubber is interposed between the front lens 6 of the stoplight and the rear window 1 of the motor vehicle so that the protector surrounds the lens, as shown in FIG. 14. As a result, light reflected by the rear window 1 is blocked by the protector 8 so as not to proceed forward to the rearview mirror 7 of the vehicle.

However, the conventional high-mounted stoplight shown in FIG. 14 has problems in that the number of components of the stoplight is increased to make the stoplight more expensive. It is difficult to completely block the light using the protector 8, because the protector may be deformed, or displaced due to the vibration of the motor vehicle to cause a gap between the protector and the rear window which will leak light. Since the protector 8 is not colored but black to avoid reducing the durability of the rubber, the appearance of the protector does not harmonize with the trim of the vehicle interior and the color of the body cover 5 of the stoplight.

SUMMARY OF THE INVENTION

In view of the above-mentioned problems, it is an object of the present invention to positively prevent light emitted from the light source of a stoplight and reflected by the rear window of a motor vehicle from proceeding to the rearview mirror of the vehicle, being reflected by the mirror and entering the eyes of the driver of the vehicle to hinder the vision of the driver, without using a protector surrounding the front lens of the stoplight.

The position of the eyes of the driver of a motor vehicle and the mounted position of the rearview mirror of the vehicle are prescribed by SAE J941 and SAE J834. The inclination of the rear window of the vehicle is also prescribed depending on the type of the vehicle. The mounted position of the rear stoplight is substantially prescribed. Within these prescriptions, the stoplight should be constructed and mounted so that light emitted from the stoplight and reflected by the rear window does not reach the eyes of the driver. However, it is not easy to preset the form of the front lens of the stoplight, that of the body of the stoplight, the distance between the rear window and the front lens and so forth to prevent the light from reaching the eyes of the driver.

The present inventor has investigated the case where light L emitted from the light source of stoplight 10 and transmitted upward from the front lens 20 of the stoplight reaches the rear window 1 of the motor vehicle at the largest angle $\Theta$ of incidence thereto, as shown in FIG. 1. The light L proceeds along the foremost point $P_1$ of the front lens 20 and that $P_2$ of the upper portion of the shade of the stoplight on the vertical central longitudinal section of the stoplight. If this light when reflected by the rear window 1 does not proceed to the rearview mirror 60 of the vehicle or does not reach the eyes of the driver even though being reflected by the rearview mirror, none of the light emitted from the light source of the stoplight will enter the eyes of the driver. The present invention is the result of the knowledge obtained from this study.

The above-mentioned object can be attained by providing a high-mounted stoplight in accordance with the present invention. In the stoplight, a front lens is attached to the open front of the stoplight body, in which a light source is provided. The front lens and the open front of the body of the stoplight are located at the center of the vehicle inside the rear window and away from the window. The stoplight is characterized in that light emitted from the light source, transmitted along the foremost point of the front lens and that of the upper portion of the body of the stoplight on the vertical central longitudinal section of the stoplight and reflected by the rear window toward the front of the vehicle does not proceed to the rearview mirror of the vehicle or is not reflected by the rearview mirror toward the eyes of the driver of the vehicle. All of the light emitted from the light source and reflected by the rear window of the vehicle toward the front of the vehicle is thus prevented from entering the eyes of the driver.

BRIEF DESCRIPTION OF THE DRAWINGS

FIG. 5 is a sectional view of the stoplight taken along line V—V shown in FIG. 2;

DETAILED DESCRIPTION OF THE PREFERRED EMBODIMENTS

Embodiments of the present invention are hereafter described with reference to the drawings attached hereto.

Figure 1:
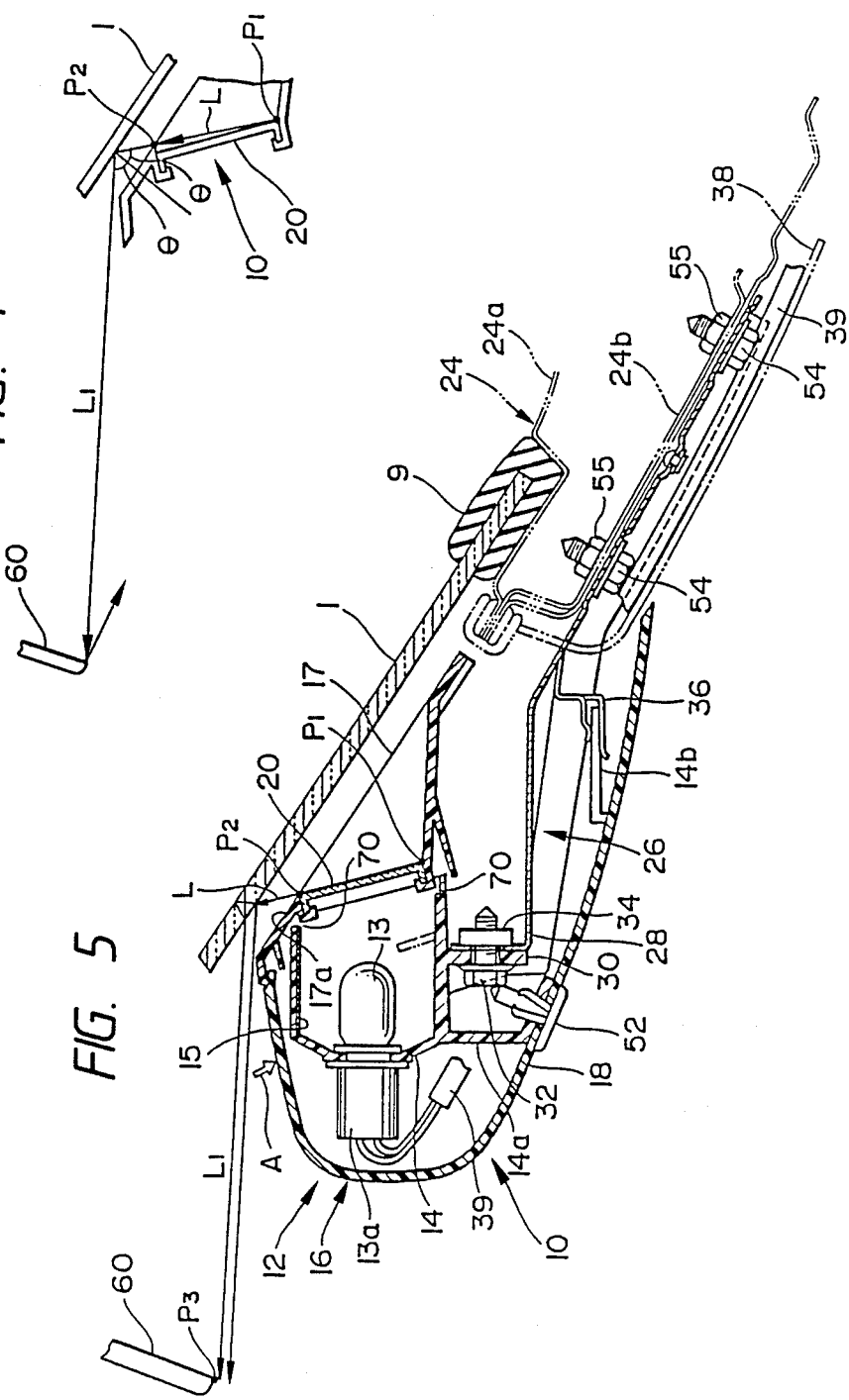
FIG. 1 is a view explaining the principle of the present invention.
Figure 2:
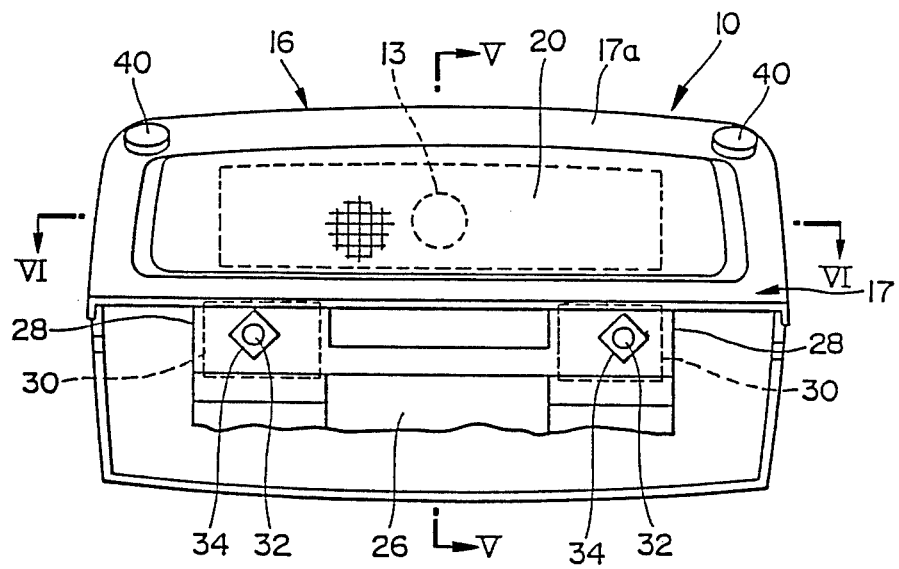
FIG. 2 is a front view of a high-mounted stoplight according to an embodiment of the present invention.
Figure 3:
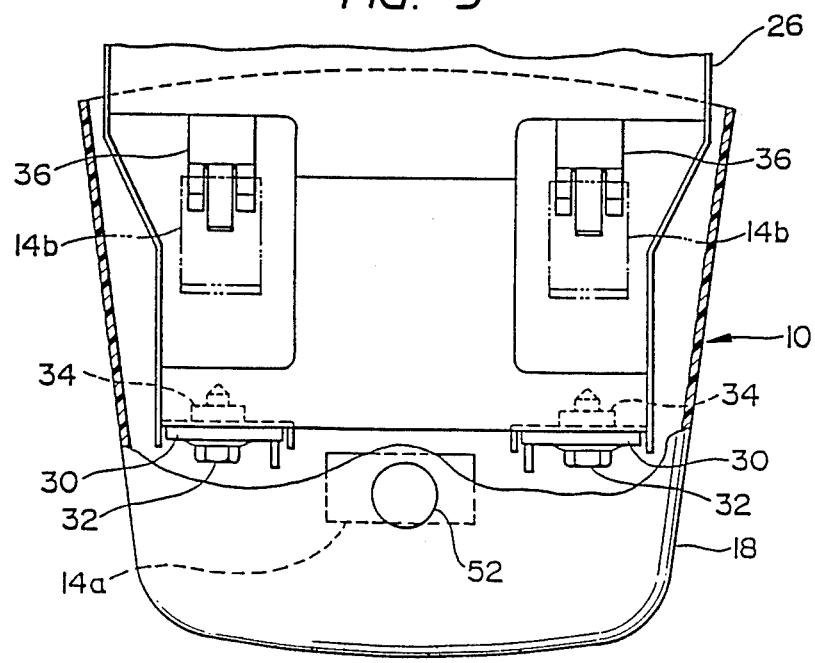
FIG. 3 is a cutaway bottom view of the stoplight.
Figure 4:
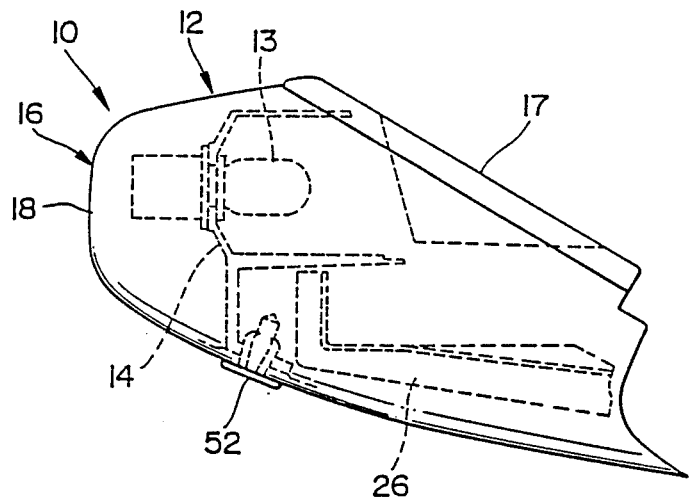
FIG. 4 is a left side view of the stoplight.
Figure 6:
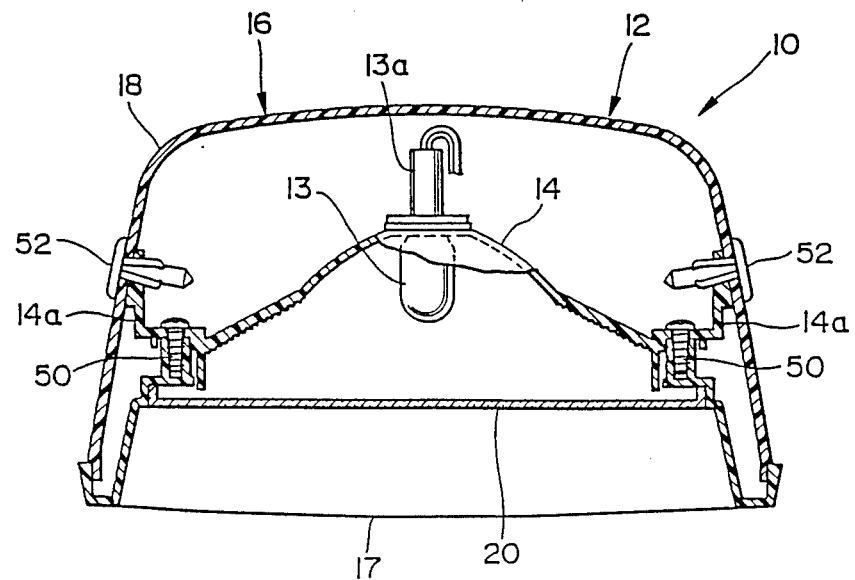
FIG. 6 is a sectional view of the stoplight along line VI—VI shown in FIG. 2.

FIGS. 2, 3, 4, 5, 7, 8 and 9 show a high-mounted stoplight 10 according to one embodiment. FIG. 2 shows a front view of the stoplight 10. FIG. 3 shows a bottom view of the stoplight 10. FIG. 4 shows the left side view of the stoplight. FIG. 5 is a sectional view of the stoplight along line V—V shown in FIG. 2. FIG. 6 is a sectional view of the stoplight along line VI—VI of FIG. 2. The stoplight 10 is secured to the rear structure 24 of the motor vehicle and is located centrally inside the rear window 1. The stoplight 10 comprises a body 12 made of a synthetic resin, and a front lens 20 integrally coupled with the body. The stoplight 10 is located near the rear window 1, secured to the outer plate 24a of the body of the vehicle adjacent rubber edging 9, as shown in FIG. 5.

Figure 7:
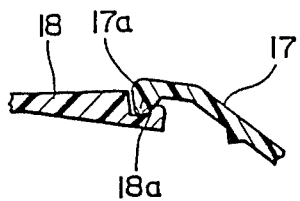
FIG. 7 is an enlarged partial sectional view of a body cover and a shade of the stoplight.

The body 12 of the stoplight 10 comprises a main section 14 housing a bulb 13 and shaped as an enclosure open at the rectangular front thereof, and a body cover 16 covering the body except for the open front. The bulb 13 is fitted in a socket 13a attached to the main section 14, so that the bulb can be attached and detached together with the socket to and from the main section from behind. The inside surface of the main section 14 is coated with a heat-resistant protector 15 above the bulb 13. A shade 17 is attached to the peripheral edges of the open front of the main section 14 by screws 50 and an adhesive, as shown in FIG. 6. The main section 14 has notches 70 at the peripheral edges of the open front as shown in FIG. 5, to allow heat transfer out of the main section. The front lens 20 is fastened to the shade 17 by ultrasonic fuse-bonding and covers the open front of the main section 14. The outside surface of the front lens 20 is slightly inclined from a vertical plane so that the bottom of the outside surface is located in front of the top thereof. Section 14 is provided with a plurality of coupling arms 14a to which the body 18 of the cover 16 is coupled by rivets 52, as shown in FIGS. 5 and 6. The shade 17 and the cover body 18 are provided with a projection 17a and a recess 18a in appropriate locations, respectively, along the width of the cover (in a direction perpendicular to the surface of FIG. 5), and are fitted with each other as shown in FIG. 7, so that the shade and the cover body are coupled to each other. The body cover 16 comprises the shade 17 attached to the peripheral edges of the open front of the main section 14 of the stoplight body 12, and the cover body 18 surrounding the whole. The portion of the body cover 16 which is visible from the outside is processed to have small projections and recesses. The shade 17 extends along the peripheral edges of the front lens 20. The front of the shade 17, which faces the rear window 1 of the vehicle, has the same inclination as the rear window 1. The surface of the upper portion 17a of the shade 17 meets with the top of the front lens 20. The shade 17 is located near the rear window 1 so that light emitted from the bulb 13 and reflected by the rear window toward the front of the vehicle proceeds under the rearview mirror 60 of the vehicle. To be more specific, the shade 17 is located and shaped so that the rays $L_1$ of light, which are emitted from the bulb 13 and transmitted from the bottom point (foremost point) $P_1$ of the front lens 20 and by the foremost point $P_2$ of the upper portion 17a of the shade in the vertical central longitudinal section of the stoplight 10 and reflected by the rear window 1 toward the front of the vehicle proceed under the bottom $P_3$ of the rearview mirror 60, as shown in FIG. 5. All light emitted from the bulb 13 and reflected by the rear window 1 is thus prevented from being reflected by the mirror and entering the eyes of the driver to hinder his vision. To this end, the foremost point $P_2$ of the upper portion 17a of the shade 17 is located so that light L emitted from the bulb 13, transmitted upward from the front lens 20 and reflected by the rear window 1 at the largest angle of incidence thereto (as shown by $L_1$ in FIG. 5) proceeds under the rearview mirror 60. Since the angle of reflection of all other light from the rear window 1 is smaller than that $\Theta$ of the light $L_1$ and the light $L_1$ proceeds under the rearview mirror 60, all of the light reflected by the rear window toward the front of the motor vehicle thus proceeds under the rearview mirror. All of the light emitted from the bulb 13 and reflected by the rear window 1 is thus prevented from proceeding to the rearview mirror and being reflected toward the driver.

Figure 8:
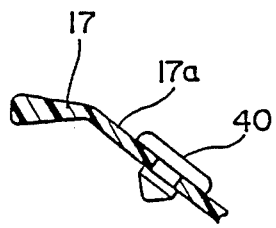
FIG. 8 is an enlarged partial sectional view of the shade.

The upper portion 17a of the shade 17 may be fitted with small circular rubber pads 40 at both ends of the portion to regulate the mounted position of the stoplight 10, as shown in FIGS. 2 and 8.

Figure 9:
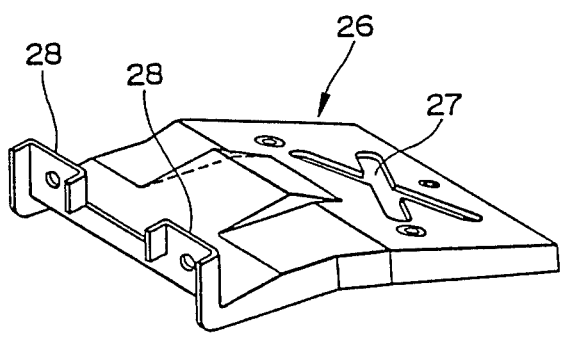
FIG. 9 is an enlarged perspective view of a bracket of the stoplight.

The main section 14 of the stoplight body 12 is secured to a bracket 26 attached to the rear structure 24 of the motor vehicle by bolts 54 and nuts 55, as shown in FIG. 5. The bracket 26 is constituted as a slightly bendable frame, as shown in FIG. 9. The portion of the bracket 26 which is secured to the rear structure 24 of the vehicle has reinforcing slots extending cruciformly and has a pair of body support portions 28 at one end. The bottom of the main section 14 of the stoplight body 12 is formed with a pair of lugs 30 clamped to the body support portions 28 of the bracket 26 by bolts 32 and nuts 34. A hook 36 is welded to the bottom of the bracket 26. A lug 14b provided on the inside surface of the cover body 18 is engaged in the hook 36.

Also shown in the drawings are a trunk plate 38 defining the trunk space, a vinyl tube 39 protecting lead wires for the bulb 13, and the outer plate 24a and inner plate 24b constituting the rear structure 24 of the vehicle.

The procedure of attaching the stoplight 10 to the motor vehicle is now described. The main section 14 of the body 12 of the stoplight 10, the shade 17 and the front lens 20 are assembled together in advance. The bracket 26 is then secured to the rear structure 24 of the vehicle by the bolts 54 and the nuts 55. Section 14 assembled with the shade 17 and the front lens 20 is attached to the body support portions 28 of the bracket 26 by the bolts 32. The body 18 of the body cover 16 is then attached to the rear of the section 14 of the stoplight body 12. At that time, the upper portion of the cover body 18 is pushed down obliquely, as shown by an arrow A in FIG. 5, as the lug 14b remains engaged in the hook 36, so that the projection 17a of the shade 17 is almost automatically fitted in the recess 18a of the cover body. The cover body 18 can thus be easily attached to the main section 14 of the stoplight body 12. The cover body 18 is secured to the main section 14 by the rivets 52.

Figure 10:
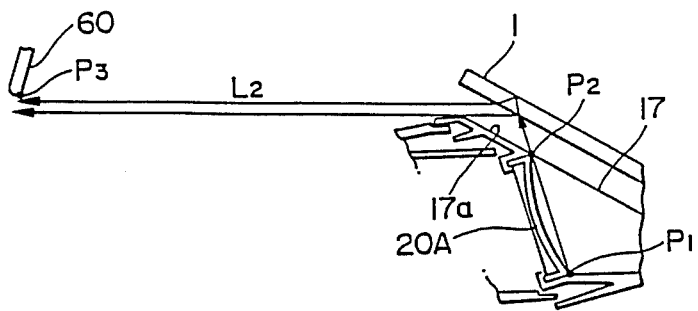
FIG. 10 is a schematic view of a major section of a high-mounted stoplight according to another embodiment of the present invention.

FIG. 10 shows a major section of a high-mounted stoplight of another embodiment. The stoplight has a front lens 20A which is concave on the outside thereof. The shade 17 of the stoplight is located and shaped so that light $L_2$ emitted from the bulb of the stoplight, transmitted from the bottom point (foremost point) $P_1$ of the front lens 20A and past $P_2$ of the upper portion 17a of the shade in the vertical central longitudinal section of the stoplight and reflected by the rear window of the vehicle toward the front of the vehicle proceeds under the bottom $P_3$ of the rearview mirror 60 of the vehicle so as not to be reflected by the mirror and enter the eyes of the driver.

Figure 11:
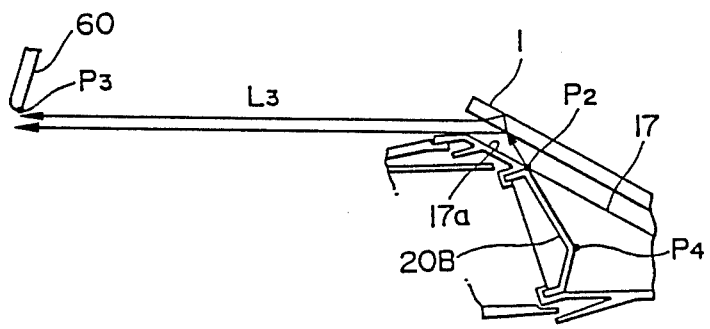
FIG. 11 is a schematic view of a major section of a high-mounted stoplight according to a third embodiment of the present invention.

FIG. 11 shows a major section of a high-mounted stoplight of yet another embodiment. The stoplight has a front lens 20B which is convex on the outside thereof. The shade 17 of the stoplight is located and shaped so that light $L_3$ emitted from the bulb of the stoplight, transmitted from the foremost point $P_4$ of the front lens 20B and past $P_2$ of the upper portion 17a of the shade in the vertical central longitudinal section of the stoplight and reflected by the rear window 1 of the vehicle proceeds under the bottom $P_3$ of the rearview mirror 60 of the vehicle so as not to be reflected by the mirror and enter the eyes of the driver.

Figure 12:
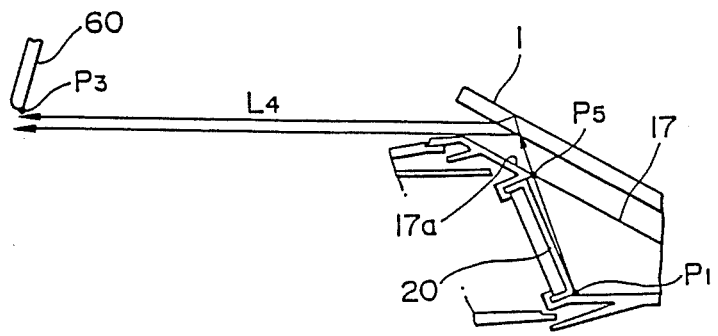
FIG. 12 is a schematic view of a major section of a fourth embodiment of the present invention.
Figure 13:
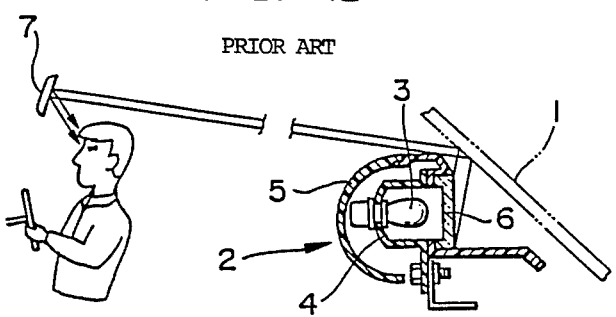
FIG. 13 is a sectional view of a conventional high-mounted stoplight.
Figure 14:
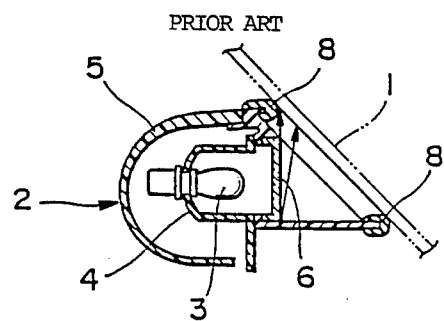
FIG. 14 is a sectional view of another conventional high-mounted stoplight.

FIG. 12 shows a major section of a high-mounted stoplight according to another embodiment. The stoplight has a front lens 20 flat on the inside and outside thereof like that of FIGS. 2, 3, 4, 5, 6, 7, 8 and 9. The foremost edge of the upper portion 17a of the shade 17 of the stoplight is located in front of the top of the front lens 20. The shade 17 is located and shaped so that light $L_4$ emitted from the bulb of the stoplight, transmitted from the bottom point $P_1$ of the front lens 20 and past foremost point $P_5$ of the upper portion 17a of the shade 17 in the vertical central longitudinal section of the stoplight and reflected by the rear window 1 of the vehicle proceeds under the bottom $P_3$ of the rearview mirror 60 of the vehicle so as not to be reflected by the mirror and enter the eyes of the driver.

Although the shade 17 in each of the above-described embodiments is shaped and located so that the light emitted from the bulb and reflected by the rear window 1 at the maximum angle proceeds under the rearview mirror 60, the shade may be shaped and located so that the light is reflected by the rearview mirror toward the driver but not toward the eyes of the driver.

The present invention is not confined to the above-described embodiments, but may be embodied or practiced in other various ways without departing from the spirit or essential character thereof. For example, the present invention may be embodied as a high-mounted stoplight in which a body cover is not provided and the front lens is directly attached to the main section of the body of the stoplight.

According to the present invention, a high-mounted stoplight is provided for a motor vehicle such that the front lens of the stoplight and the open front of the body of the stoplight are located away from the rear window of the vehicle, and light emitted from the light source of the stoplight, transmitted from the foremost point of the front lens and past the upper portion of the shade of the stoplight in the vertical central longitudinal section of the stoplight and reflected by the rear window toward the front of the vehicle does not proceed to the rearview mirror of the vehicle or is not reflected by the mirror to proceed toward the eyes of the driver of the vehicle. Therefore, the present invention is entirely different from the conventional art in which a stoplight is provided with a protector tightly surrounding the entire light passage from the stoplight. According to the present invention, light is surely prevented from hindering the vision of the driver.

Since a protector is not needed for the stoplight provided in accordance with the present invention, the cost of the stoplight is diminished. Also avoided is the possibility that the color of the protector does not harmonize with that of the trim of the motor vehicle and therefore deteriorates the appearance of the vehicle.

What is claimed:

1. A high-mounted stoplight for a motor vehicle, comprising: a body, a front lens attached to an open front of said body; a light source provided in said body, said lens and said one front being located at the center rear of said vehicle inside a rear window thereof and spaced from said window; and means for ensuring that light emitted from said light source, transmitted from the foremost point of said lens and along an upper portion of shade means of said stoplight at the vertical central longitudinal section of said stoplight and reflected by said rear window toward the front of said vehicle does not proceed to a rearview mirror of said vehicle or is not reflected by said mirror toward the eyes of the driver of said vehicle, said ensuring means being spaced from said window.

2. A high-mounted stoplight as claimed in claim 1, wherein said ensuring means comprises said shade means.

3. A high-mounted stoplight as claimed in claim 1, wherein aid ensuring means comprises shade means having a predetermined height above said lens, said lens being located at a selected angle with respect to and distance from said rear window.

4. A high-mounted stoplight as claimed in claim 3, wherein said height, said angle and said distance are collectively set such that all light reflected from said rear window passes beneath said rearview mirror.

5. A high-mounted stoplight as claimed in claim 3, wherein said height, said angle and said distance are collectively set such that light reflected from said rear window at a maximum possible reflection angle passes below said rearview mirror.

6. A high-mounted stoplight as claimed in claim 1, wherein said lens is concave facing said rear window.

7. A high-mounted stoplight as claimed in claim 1, wherein said lens is generally convex facing said rear window.

8. A high-mounted stoplight as claimed in claim 1, wherein said shade means abuts against an upper surface of said lens, and protrudes beyond the upper surface of said lens toward said rear window.

* * * * *